United States Patent
Higuchi et al.

(10) Patent No.: US 11,819,030 B2
(45) Date of Patent: Nov. 21, 2023

(54) ROLL-FORMING DEVICE FOR FOOD DOUGH PIECE AND ROLL-FORMING METHOD THEREFOR

(71) Applicant: RHEON AUTOMATIC MACHINERY CO., LTD., Tochigi (JP)

(72) Inventors: Katsumichi Higuchi, Tochigi (JP); Taro Fukugami, Tochigi (JP); Akihiro Orui, Tochigi (JP)

(73) Assignee: Rheon Automatic Machinery Co., Ltd., Tochigi (JP)

( * ) Notice: Subject to any disclaimer, the term of this patent is extended or adjusted under 35 U.S.C. 154(b) by 582 days.

(21) Appl. No.: 17/058,957

(22) PCT Filed: May 29, 2019

(86) PCT No.: PCT/JP2019/021271
§ 371 (c)(1),
(2) Date: Nov. 25, 2020

(87) PCT Pub. No.: WO2019/230791
PCT Pub. Date: Dec. 5, 2019

(65) Prior Publication Data
US 2021/0212324 A1 Jul. 15, 2021

(30) Foreign Application Priority Data

May 31, 2018 (JP) ................................ 2018-104413
Feb. 1, 2019 (JP) ................................ 2019-016806

(51) Int. Cl.
*A21C 3/06* (2006.01)
(52) U.S. Cl.
CPC ..................................... *A21C 3/06* (2013.01)

(58) Field of Classification Search
CPC ....................................................... A21C 3/06
See application file for complete search history.

(56) References Cited

U.S. PATENT DOCUMENTS 5,078,585 A 1/1992 Morikawa et al.
5,538,414 A * 7/1996 Kobayashi ............... A21C 3/06
425/371

(Continued)

FOREIGN PATENT DOCUMENTS

| JP | S6261533 A | 3/1987 |
| JP | H0279930 A | 3/1990 |
| JP | H08308466 A | 11/1996 |

OTHER PUBLICATIONS

International Search Report, PCT/JP2019/021271, dated Sep. 3, 2019.

*Primary Examiner* — Dana Ross
*Assistant Examiner* — Joe E Mills, Jr.
(74) *Attorney, Agent, or Firm* — Dilworth & Barrese, LLP

(57) ABSTRACT

A rolled food dough having a good shape is stably produced. The rolled food dough is arranged on a conveyor in an orderly manner. A roll-forming device and method having high production capacity are provided. The downstream end portion PL of the food dough piece P is deflected by a middle-speed conveyor 1 and a high-speed conveyor 3 facing each other in an up-down direction, folded and adhesively pressed between a following low-speed conveyor 2 and the high-speed conveyor 3 to form a rolling core PA, and rolled due to a speed difference between the facing conveyors.

14 Claims, 14 Drawing Sheets

(56) References Cited

U.S. PATENT DOCUMENTS 5,655,439 A 8/1997 Ueno et al.
2018/0325123 A1* 11/2018 Bernhardt .............. A21C 9/085

* cited by examiner

ROLL-FORMING DEVICE FOR FOOD DOUGH PIECE AND ROLL-FORMING METHOD THEREFOR

TECHNICAL FIELD

The present invention relates to a device and a method for forming a rolled-state food dough from a flat-state food dough piece, such as a bread dough.

BACKGROUND ART

A device for roll-forming a food dough piece and a method therefor are widely known. For example, Patent Document 1 discloses a device for rolling up a food dough piece on a conveyor from its downstream end portion with a rubber plate. Patent Document 2 discloses a device for rolling up a food dough piece on a conveyor from its downstream end with a roll-press plate. A rolling member, such as a rubber plate and a roll-press plate, may be any member which gives resistance to a food dough piece being conveyed, and may be replaced with, for example, a flexible member or a net-like chain.

Patent Document 3 discloses a roll-up device which includes a front conveyor, a rear conveyor with an inclined guide surface at its inlet, and a roll-up conveyor located above the rear conveyor. A surface of the roll-up conveyor facing the rear conveyor moves in an opposite direction with respect to a surface of the rear conveyor facing the roll-up conveyor. A downstream end portion of the food dough piece being conveyed is directed upward by the inclined guide surface and urged in a direction opposite to the conveying direction by the roll-up conveyor so that the food dough piece is rolled up.

As described above, conventional roll-up devices form a food dough piece by lifting an end thereof. The food dough piece is conveyed in the conveying direction and contacts a rolling member or a rolling conveyor. A resistance at that time causes the downstream end portion of the food dough piece to be turned upwardly so that a rolling core is formed. The rolling core rotates while being urged in a direction opposite to the conveying direction of the food dough piece, and the remaining portion of the food dough piece is rolled around the rolling core so that a rolled food dough is formed from the food dough piece.

PRIOR ART PUBLICATION

Patent Document 1: JP S62-61533 A
Patent Document 2: JP H08-308466 A
Patent Document 3: JP H02-079930 A

SUMMARY OF THE INVENTION

Problem to be Solved by the Invention

A conventional roll-forming device has a problem of mal-forming. Such a conventional roll forming device starts roll-forming process from lifting a downstream end of a food dough piece so that the downstream end turns upward. A rolling core is formed due to resistance against the food dough piece, which resistance varies depending on food dough piece and thus, forming the rolling core is not stable. Thus, in the roll-forming process, the food dough piece may turn with respect to the conveying direction so that the rolling core is formed obliquely, or a cavity may be formed in a center of the rolled food dough so that a roll-forming process is not sufficiently performed. In addition, the conventional roll-forming device has a problem of fluctuation of a position of a rolled tip of the rolled food dough. In the conventional roll-forming device, a start location of the roll-forming process is not stable because the food dough piece may slide with respect to, for example, the rolling member. Due to the fluctuation of the starting location, the rolled food doughs on the conveying conveyor have different positions of the rolled end.

The conventional roll-forming device has another problem of stagnation of food dough pieces. In a roll-forming line for a rolled food dough, a forming device of food dough pieces is provided upstream of the roll-forming device, and the food dough piece are continuously supplied to the rolled forming device at predetermined intervals along the conveying direction. In the conventional roll-forming device, a food dough piece may not enter a space between the rolling member and the conveying conveyor due to the resistance against the rolling member which resistance inhibits the food dough piece from being conveyed. Then, the food dough piece is not conveyed from an upstream end of the rolling member and continues to rotate so that the food dough piece contacts and then adheres to a following food dough piece.

The conventional roll-forming device has a problem of difficulty in enhancement of production capacity. If a moving speed of the forming line including the roll-forming device increases in order to increase a number of the food dough pieces processed per unit time, the above-stated mal-forming would increasingly occur. In addition, if the intervals between the food dough pieces decrease in order to increase the number of food dough pieces processed per unit conveying length, the above-stated adhesion would increasingly occur due to the above-stated stagnation.

Means for Solving the Problem

The present invention provides a device for roll-forming food dough piece includes a middle-speed conveyor; a low-speed conveyor which is disposed adjacent to and downstream of the middle-speed conveyor; and a high-speed conveyor facing the middle-speed and low-speed conveyors in an up-down direction, wherein the middle-speed and low-speed conveyors define a recess facing the high-speed conveyor between a downstream end portion of the middle-speed conveyor and an upstream end portion of the low-speed conveyor; wherein moving directions of moving surfaces of the middle-speed and low-speed conveyors on a side facing the high-speed conveyor and a moving direction of a moving surface of the high-speed conveyor on a side facing the middle-speed and low-speed conveyors are the same as a conveying direction of conveying a food dough piece from an upstream side to a downstream side; wherein a moving speed of the low-speed conveyor is lower than a moving speed of the middle-speed conveyor; wherein a moving speed of the high-speed conveyor is higher than the moving speed of the middle-speed conveyor; wherein the high-speed conveyor is disposed with respect to the middle-speed conveyor so that a downstream end portion of the food dough piece is deflected into the recess; and wherein the high-speed conveyor is disposed with respect to the low-speed conveyor so that a rolling core of the food dough piece is formed and the food dough piece is rotated and rolled in the conveying direction on the low-speed conveyor.

In the above-stated device for roll-forming food dough piece, preferably, the high-speed conveyor is disposed above the middle-speed and low-speed conveyors, and an upstream end portion of the high-speed conveyor is disposed upstream of the downstream end portion of the middle-speed conveyor. More preferably, the moving surface of the high-speed conveyor is disposed so that a clearance between the moving surface of the high-speed conveyor and the moving surfaces of the middle-speed and low-speed conveyors becomes larger from the upstream side toward the downstream side; the high-speed conveyor is a belt conveyor, and the moving surface of the high-speed conveyor facing the lower low-speed conveyor has a downward flexure; or the device further includes an adjustment conveyor for adjusting a position of a rolled tip of the rolled food dough, the adjustment conveyor being disposed above the low-speed conveyor and disposed adjacent to and downstream of the high-speed conveyor. More preferably, the device includes a camera for detecting information relating to a position of the rolled tip of the rolled food dough, the camera being disposed downstream of the adjustment conveyor. The device may include a press roller which is disposed upstream of the high-speed conveyor above the middle-speed conveyor.

In the above-stated roll-forming device according to the present invention, preferably, the middle-speed and low-speed conveyors are disposed above the high-speed conveyor. More preferably, the moving surface of the middle-speed conveyor is disposed so that a clearance between the moving surface of the middle-speed conveyor and the moving surface of the high-speed conveyor becomes smaller from the upstream side toward the downstream side, and the moving surface of the low-speed conveyor is disposed so that a clearance between the moving surface of the low-speed conveyor and the moving surfaces of the high-speed conveyor becomes larger from the upstream side toward the downstream side. Further, more preferably, the low-speed conveyor is a belt conveyor, the moving surface facing the high-speed conveyor disposed below the low-speed conveyor has a downward flexure. More preferably, the device further includes an adjustment conveyor for adjusting a position of a rolled tip of the rolled food dough, the adjustment conveyor being disposed above the low-speed conveyor and disposed adjacent to and downstream of the high-speed conveyor. More preferably, the device includes a camera for detecting information relating to a position of the rolled tip of the rolled food dough, the camera being disposed downstream of the adjustment conveyor.

The present invention provides a method of forming a rolled food dough from a food dough piece comprising steps of conveying a food dough piece into a space between a middle-speed conveyor and a high-speed conveyor, a speed of the high-speed conveyor being higher than a speed of the middle-speed conveyor, the high-speed conveyor facing the middle-speed conveyor and moving in the same direction as the middle-speed conveyor; feeding a high-speed-conveyor-side portion of the food dough piece faster than a middle-speed-conveyor-side portion of the food dough piece due to a speed difference between the middle-speed conveyor and the high-speed conveyor, so as to deflect a downstream end portion of the food dough piece toward a middle-speed-conveyor side; causing the deflected downstream end portion of the food dough piece to collide with an upstream end portion of a low-speed conveyor which is disposed downstream of the middle-speed conveyor, a speed of which is lower than the middle-speed conveyor, and which moves in the same direction as the middle-speed conveyor; forming a buckling part in the deflected downstream end portion of the food dough due to a speed difference between the middle-speed conveyor and the low-speed conveyor, and folding the deflected downstream end portion at the buckling part; adhesively pressing the folded downstream end portion of the food dough piece between the low-speed conveyor and the high-speed conveyor facing the low-speed conveyor so as to form a rolling core; and rolling the food dough piece around the rolling core between the low-speed conveyor and the high-speed conveyor due to a speed difference between the low-speed conveyor and the high-speed conveyor so as to form a rolled food dough.

The present invention can stably produce rolled food doughs having a good shape. In the present invention, the downstream end portion of the food dough piece is deflected by using the middle-speed conveyor and the high-speed conveyor facing each other in up-down direction, and then folded and adhesively pressed between the subsequent low-speed conveyor and the high-speed conveyor to form a rolling core. Since the food dough piece is formed while its movement is controlled, the above-mentioned mal forming is not likely to occur. Further, the roll-forming process of the food dough pieces which are continuously supplied starts at the recess defined between the middle-speed conveyor and the low-speed conveyor which are disposed adjacent to each other. Since the start location of the roll-forming is stable, the positions of the end tips of the rolled food doughs on the conveyor are the same.

In the present invention, the food dough pieces (or rolled food doughs) are prevented from stagnating in the roll-forming device. Specifically, in the present invention, since facing surfaces of the middle-speed and low-speed conveyors disposed adjacent to each other and a facing surface of the high-speed conveyor which faces the middle-speed and low-speed conveyors in the up-down direction are moved in the same direction as the conveying direction, the food dough pieces (or the rolled food dough)s are always conveyed and discharged in the conveying direction. In contrast, in the conventional roll-forming device, since the food dough piece may be inhibited from being conveyed by the resistance of the rolling-up member, the food dough piece may stagnate at the rolling-up member and adhesively contact the following food dough piece. Further, when a food dough piece is rolled up by using the resistance of the rolling-up member as in the conventional roll-forming device, a pitch of the rolled food doughs discharged from the roll-forming device tends to be smaller than a pitch of the food dough pieces entering the roll-forming device. As a result, the food dough piece and the following food dough piece may adhere each other.

According to the present invention, the stable roll-forming can be achieved, as described above, and the stagnation in the roll-forming device can be prevented. As a result, the pitch of the rolled food doughs becomes constant. Thus, the moving speed of the forming line including the roll-forming device can be increased, the intervals between the food dough pieces continuously supplied can be reduced, and production capacity can be enhanced. In contrast, if the production capacity is tried to increase in the conventional roll-forming device, the moving speeds of the conveyors would be required to be relatively slow to have a sufficient pitch between the rolled food doughs, and stable production would be difficult.

DESCRIPTION OF EMBODIMENTS

Figure 1:
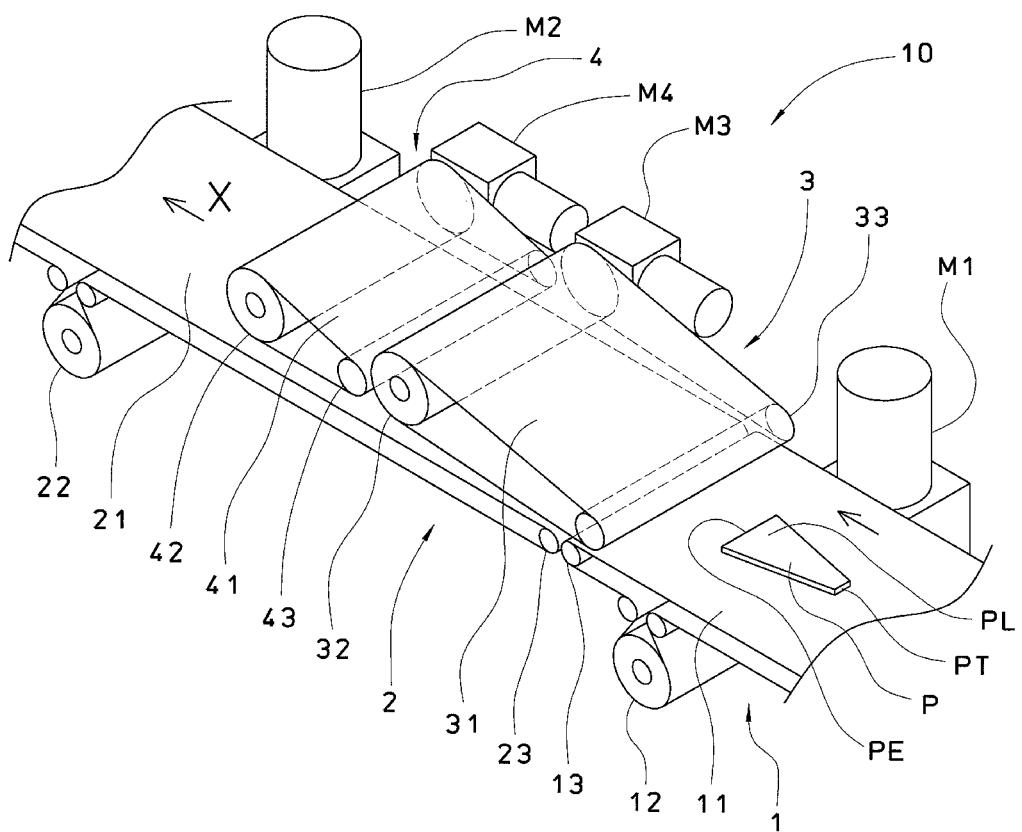
FIG. 1 is a perspective view of a roll-forming device according to a first embodiment of the present invention.

Referring to the drawings, some exemplary embodiments will be explained. In the explanation below, although a croissant is formed from a food dough piece in which bread dough layers and fat layers are laminated, the present invention is not limited to such a croissant. The food dough piece may be another kind of doughs, and a shape and a size thereof may be appropriately selected within a scope in which a food dough piece can be rolled. For example, the present invention is also applicable to productions of, for example, a bread roll, a baguette and a bread baked in a mold.

Figure 2:
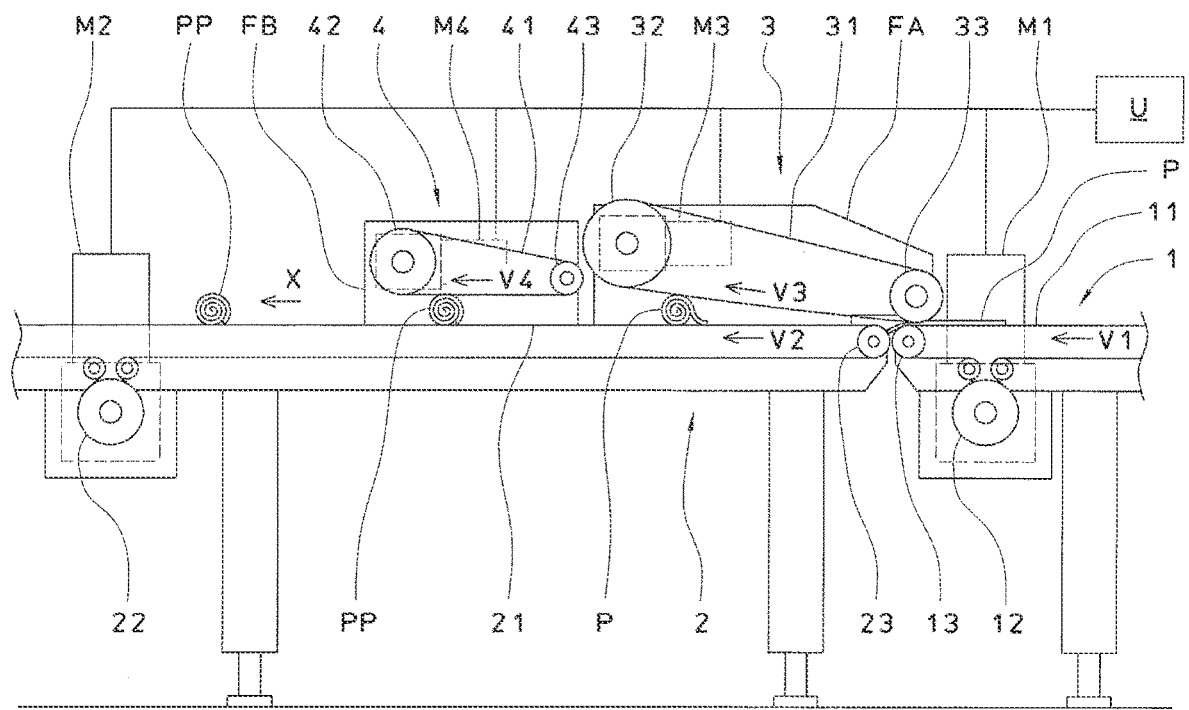
FIG. 2 is a front view of the roll-forming device according to the first embodiment of the present invention.
Figure 3:
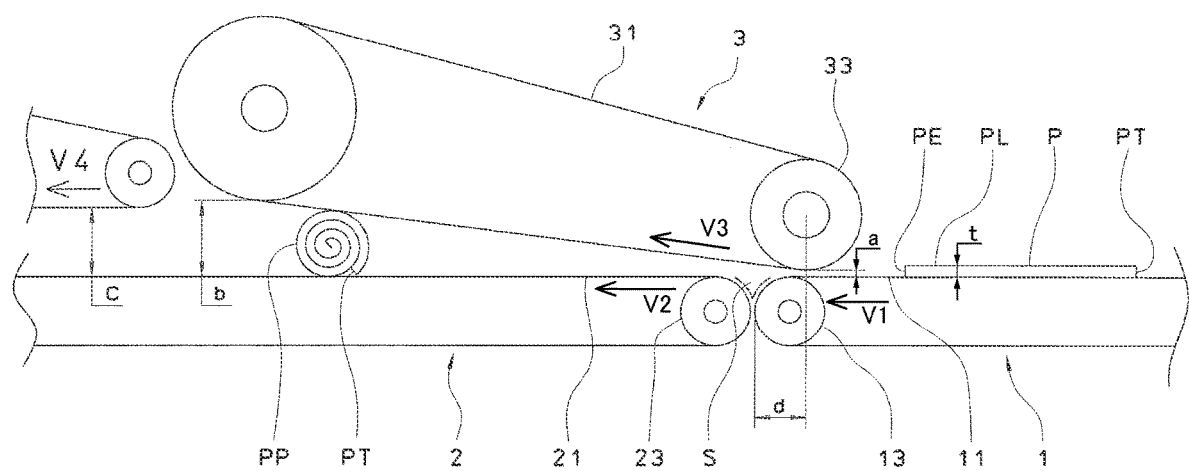
FIG. 3 is a front view of a main part of the roll-forming device according to the first embodiment of the present invention.

Referring to FIGS. 1-3, a roll-forming device 10 according to a first embodiment of the present invention includes a middle-speed conveyor 1, a low-speed conveyor 2, a high-speed conveyor 3, and an adjustment conveyor 4. The roll-forming device 10 forms a rolled food dough PP from a food dough piece P while the food dough piece P is conveyed in a conveying direction X (from right-hand side to left-hand side in FIG. 2). The food dough piece P is a croissant dough piece with an approximately triangular shape, a downstream dough portion of which is referred to as a downstream end portion PL, a downstream base side of which is referred to as a downstream end PE, and an upstream apex of which is referred to as an upstream tip. In the rolled food dough PP the upstream tip PT is also referred to as a rolled tip PT.

The middle-speed conveyor 1 is a belt conveyor, in which an endless belt 11 is wound around a drive pulley 12 and pulleys which include a driven pulley 13 defining a downstream end portion of the middle-speed conveyor 1. The drive pulley 12 is controllably rotated by a first motor M1. The low-speed conveyor 2 is disposed adjacent to and downstream of the middle-speed conveyor 1. The low-speed conveyor 2 is a belt conveyor, in which an endless belt 21 is wound around a drive pulley 22 and pulleys which include a driven pulley 23 defining an upstream end portion of the low-speed conveyor 2. The drive pulley 22 is controllably rotated by a second motor M2.

The high-speed conveyor 3 is disposed above both of the middle-speed conveyor 1 and the low-speed conveyor 2. The high-speed conveyor 3 is a belt conveyor, in which an endless belt 31 is wound around a drive pulley 32 and a driven pulley 33 which define a downstream end portion and an upstream end portion of the high-speed conveyor 3, respectively. The drive pulley 32 is controllably rotated by a third motor M3. The adjustment conveyor 4 is disposed adjacent to and downstream of the high-speed conveyor 3 and above the low-speed conveyor 2. The adjustment conveyor 4 is a belt conveyor, in which an endless belt 41 is wound around a drive pulley 42 and a driven pulley 43 which define a downstream end portion and an upstream end portion of the adjustment conveyor 4, respectively. The drive pulley 42 is controllably rotated by a fourth motor M4. The high-speed conveyor 3 and the adjustment conveyor 4 are attached in a height-adjustable way between side frames FA, FB which stand from both sides of the low-speed conveyor 2.

Hereinafter, an upper surface of the endless belt 11 of the middle-speed conveyor 1 and an upper surface of the endless belt 21 of the low-speed conveyor 2 are referred to as respective moving surfaces. Also, a lower surface of the endless belt 31 of the high-speed conveyor 3 and a lower surface of the endless belt 41 of the adjustment conveyor 4 are referred to as respective moving surfaces. Further, these moving surfaces may be also referred to as facing surfaces because the upper surfaces and the lower surfaces face each other in an up-down direction. Both a moving direction of the moving surfaces of the middle-speed conveyor 1 and the low-speed conveyor 2 and a moving direction of the moving surface of the high-speed conveyor 3 are the same as the conveying direction X, in which the food dough piece P is conveyed from the upstream side to the downstream side.

The moving surfaces of the middle-speed conveyor 1 and the low-speed conveyor 2 are set at the same height. A recess S is defined by a curved portion of the downstream end portion (or a portion along the driven pulley 13) which follows the moving surface of the middle-speed conveyor 1 and a curved portion of the upstream end portion (or a portion along the driven pulley 23) which continues to the moving surface of the low-speed conveyor 2.

The upstream end portion (or a portion along the driven pulley 33) of the high-speed conveyor 3 is disposed so as to overlap the downstream end portion of the middle-speed conveyor 1 in the conveying direction X. The lowest point of the drive pulley 32 is disposed higher than the lowest point of the driven pulley 33 to incline the moving surface of the high-speed conveyor 3 upward toward the downstream side so that a clearance between the moving surface of the high-speed conveyor 3 and the moving surfaces of the middle-speed conveyor 1 and the low-speed conveyor 2 facing each other becomes larger from the upstream side toward the downstream side. By adjusting the positional relationship of the drive pulley 32 and the driven pulley 33, a food dough piece P can be continually sandwiched between the high-speed conveyor 3 and the middle-speed and low-speed conveyors 1, 2. The moving surface of the adjustment conveyor 4 is disposed substantially parallel to the moving surface of the low-speed conveyor 2.

The positional relationships among the above-mentioned conveyors are appropriately set based on a thickness of the food dough piece P to be roll-formed. In the first embodiment, a thickness t of the food dough piece P is 5 millimeters. A vertical clearance a between the lowest point of the upstream end portion of the high-speed conveyor 3 and the moving surface of the middle-speed conveyor 1 may be 4 millimeters. A clearance b between the moving surface of the low-speed conveyor 2 and the moving surface at the downstream end portion of the high-speed conveyor 3 may be 35 millimeters. A clearance c between the moving surface of the low-speed conveyor 2 and the moving surface of the adjustment conveyor 4 may be 30 millimeters. The clearance c is appropriately determined so that the rolled food dough PP is lightly sandwiched between the moving surface of the low-speed conveyor 2 and the moving surface of the adjustment conveyor 4. A distance d by which the high-speed conveyor 3 overlaps the middle-speed conveyor 1 in the conveying direction X, namely, a distance d along the conveying direction X from the downstream end of the middle-speed conveyor 1 to the center of the driven pulley 33 of the high-speed conveyor 3 is 23 millimeters (see FIG. 3).

The control unit U is configured to adjust a moving speed of each of the belt conveyors by controlling a driving speed of each of the motors M1-M4. The moving speed of the middle-speed conveyor 1 is referred to as V1, the moving speed of the low-speed conveyor 2 is referred to as V2, the moving speed of the high-speed conveyor 3 is referred to as V3, and the moving speed of the adjustment conveyor 4 is referred to as V4. The moving speeds V1, V2, V3 are preferably set to have a relationship of V3>V1>V2. In the first embodiment, the moving speed V1 of the middle-speed conveyer 1 may be set at 50 meters per minute, the moving speed V2 of the low-speed conveyor 2 may be set at 20 meters per minute, and the moving speed V3 of the high-speed conveyor 3 may be set at 70 meters per minute. The moving speed V4 may be set at the same speed as the moving speed V2 in an initial state, but it may be finely adjusted when a position of the rolled tip PT of the rolled food dough PP is adjusted.

Figure 4A:
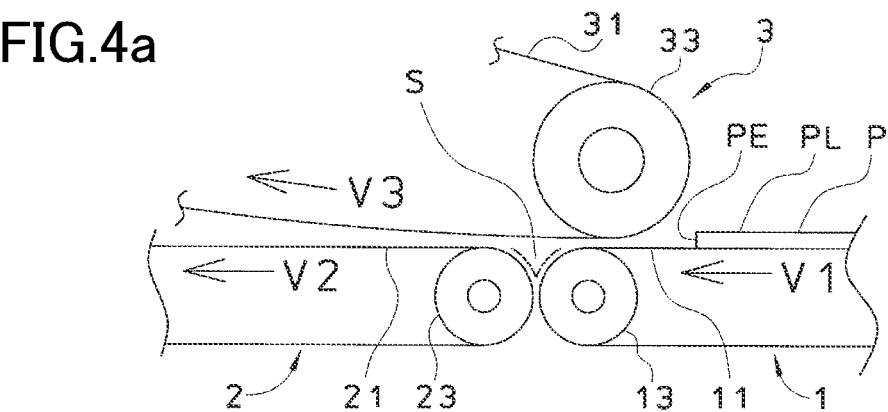
FIG. 4a is an explanatory view of a forming process of a food dough piece in the roll-forming device according to the first embodiment of the present invention.
Figure 4B:
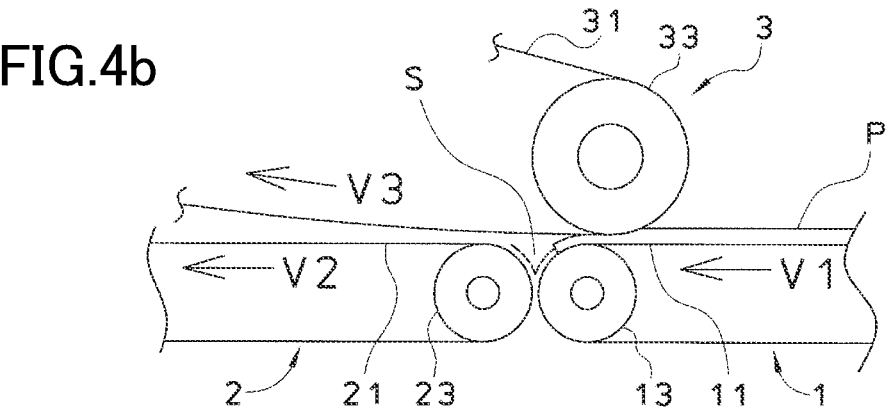
FIG. 4b is an explanatory view of a forming process of a food dough piece in the roll-forming device according to the first embodiment of the present invention.

Referring to FIGS. 4a-4g and 5, a supplied food dough piece P (see FIG. 4a) is sandwiched between the downstream end portion of the middle-speed conveyor 1 and the upstream end portion of the high-speed conveyor 3 (see FIG. 4b). Since the moving speed V3 of the high-speed conveyor 3 is set to be higher than the moving speed V1 of the middle-speed conveyor 1, an upper-side portion of the food dough piece P is fed toward the downstream side faster than a lower-side portion of the food dough piece P.

Figure 4C:
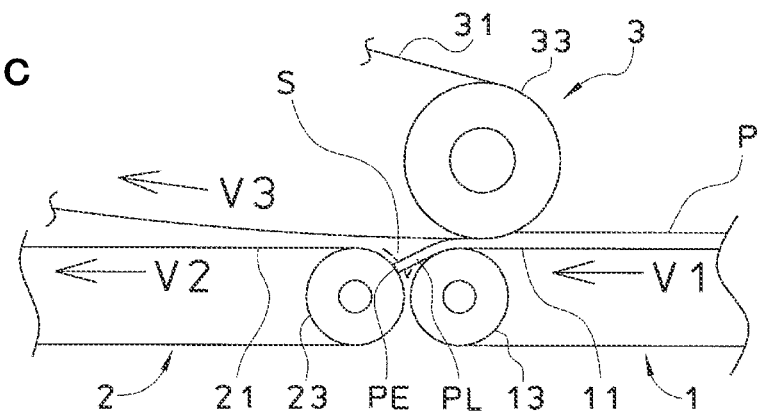
FIG. 4c is an explanatory view of a forming process of a food dough piece in the roll-forming device according to the first embodiment of the present invention.
Figure 4D:
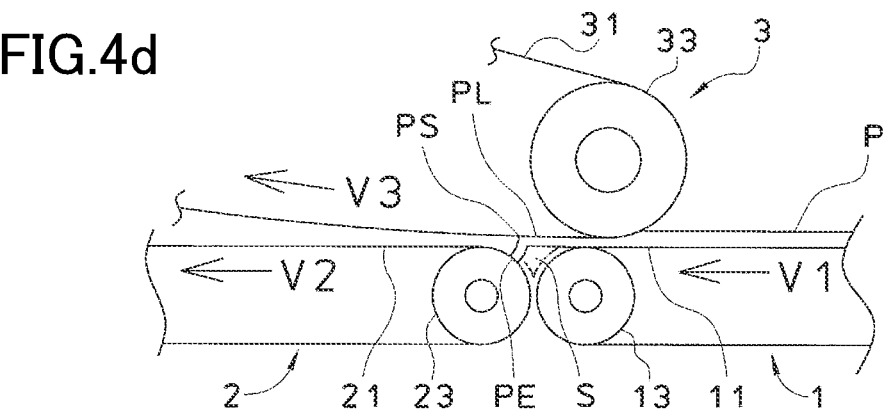
FIG. 4d is an explanatory view of a forming process of a food dough piece in the roll-forming device according to the first embodiment of the present invention.
Figure 4E:
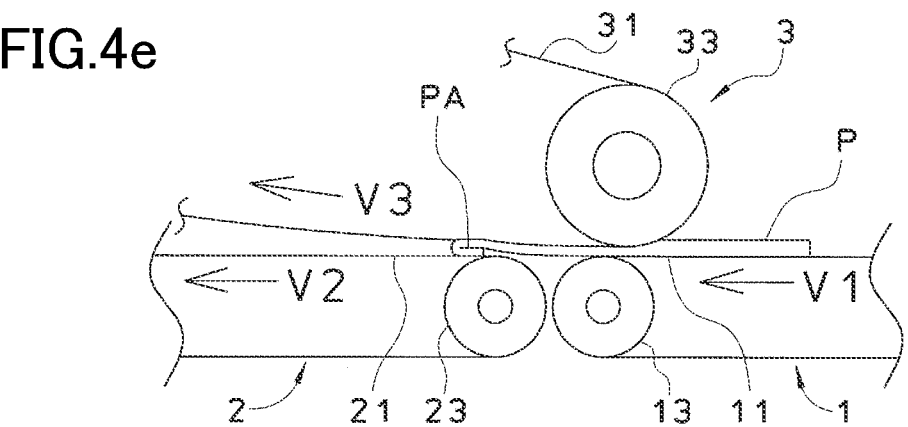
FIG. 4e is an explanatory view of a forming process of a food dough piece in the roll-forming device according to the first embodiment of the present invention.
Figure 4F:
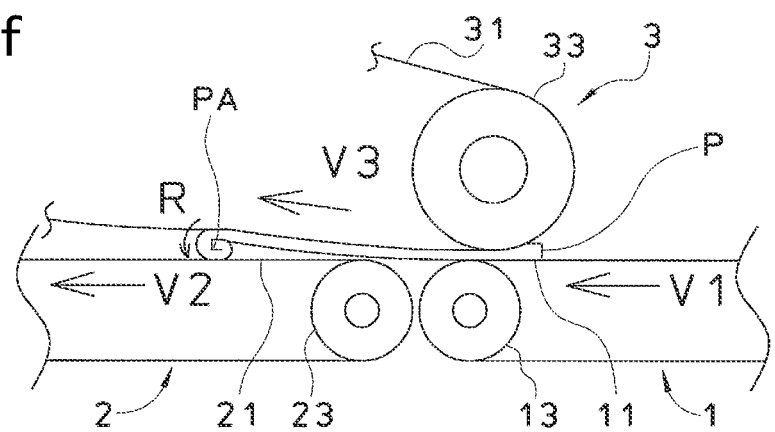
FIG. 4f is an explanatory view of a forming process of a food dough piece in the roll-forming device according to the first embodiment of the present invention.
Figure 4G:
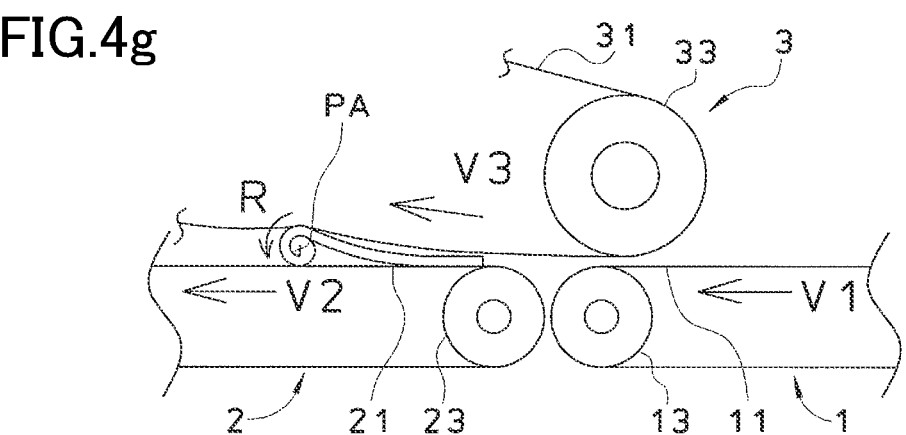
FIG. 4g is an explanatory view of a forming process of a food dough piece in the roll-forming device according to the first embodiment of the present invention.

Due to the speed difference between the upper-side portion and the lower-side portion, the downstream end portion PL of the food dough piece P is deflected obliquely downward from the downstream end portion of the middle-speed conveyor 1 to be fed into the recess S, so that the downstream end PE of the food dough piece P collides with and contacts the curved portion of the upstream end portion of the low-speed conveyor 2 (see FIG. 4c). Since the moving speed V2 of the low-speed conveyor 2 is set to be lower than the moving speed V1 of the middle-speed conveyor 1, these collision and contact cause a conveyed speed of the downstream end PE of the food dough piece P to be momentarily reduced, so that a buckling part PS is formed at the downstream end portion PL of the food dough piece P following the downstream end PE (see FIG. 4d).

Since the buckling part PS contacts the high-speed conveyor 3, the buckling part PS is fed earlier than the downstream end PE of the food dough piece P so that the downstream end portion PL of the food dough piece P is folded. The downstream end portion PL of the food dough piece P folded at the buckling part PS is overlapped and adhesively pressed between the high-speed conveyor 3 and the low-speed conveyor 2 (see FIG. 4e). The overlapped dough portion is referred to as a rolling core PA of the food dough piece P.

While the rolling core PA is fed from the recess S toward the downstream side, a rotation R is continuously given to the rolling core PA due to the speed difference between the low-speed conveyor 2 and the high-speed conveyor 3. A direction of the rotation R is defined so that the rolling core PA on the low-speed conveyor 2 is rolled in the conveying direction X (counterclockwise viewed from the front side). Since the rolling core PA is rolled, the remaining dough portion is gradually rolled around the rolling core PA at the high-speed conveyor side (See FIGS. 4f and 4g).

On the other hand, the upstream end portion of the food dough piece P is still sandwiched between the middle-speed conveyor 1 and the high-speed conveyor 3 (see FIG. 4O. Since the food dough piece P is rolled by the rotation R while it is conveyed, a tension along the conveying direction X is applied to the food dough P. Due to this tension, a possible turn of an orientation from the downstream end PE to the upstream tip PT of the food dough piece P with respect to the conveying direction X can be corrected. Further, the remaining dough portion can be tightly rolled around the rolling core PA.

After the rolled food dough PP passes through the high-speed conveyor 3, a pressing force from the upper-side high-speed conveyor 3 is eliminated, and an inertial force is caused to roll the rolled food dough PP toward the conveying direction X. On the other hand, a counter force in a direction opposite to that of the inertial force is applied to a bottom of the rolled food dough PP by the movement of the low-speed conveyor 2. Since the inertial force caused to the rolled food PP is reduced or eliminated by the counter force by the low-speed conveyor 2, the rolled food dough PP rests on the low-speed conveyor. Thus, the rolled food doughs PP are arranged at a constant interval in the conveying direction without unrolling the rolled tip of the rolled food dough PP.

The rolled food dough PP is sandwiched between the low-speed conveyor 2 and the adjustment conveyor 4 and conveyed to be slightly flattened. Since the low-speed conveyor 2 and the adjustment conveyor 4 are set to have the same moving speed, the rolled food dough PP is discharged toward the downstream side without being rotated. Although in the first embodiment, the low-speed conveyor 2 and the adjustment conveyor 4 are set to have the same moving speed, they may be set to have different speeds to slightly rotate the rolled food dough PP so that a position of the rolled tip PT of the rolled food dough PP on a conveyor disposed on the downstream side can be adjusted (see a second modification explained below referring to FIG. 6).

Figure 5:
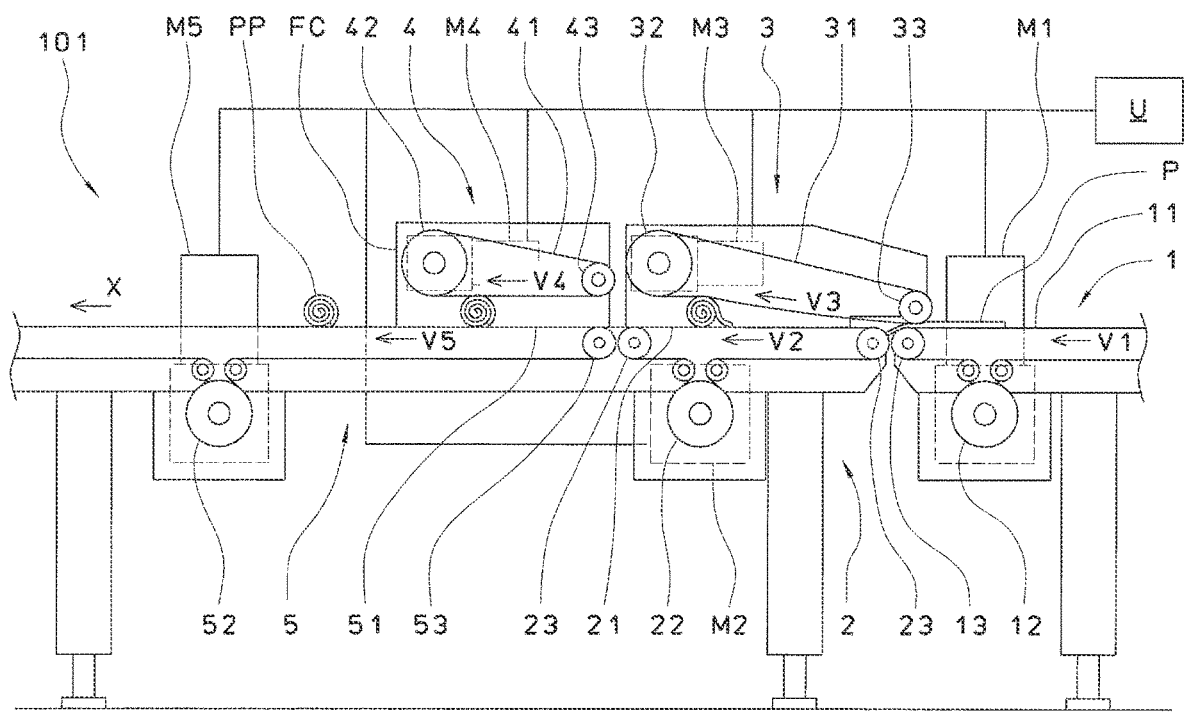
FIG. 5 is a front view of a first modification of the roll-forming device according to the first embodiment of the present invention.

FIG. 5 shows a roll-forming device 101 according to a first modification of the first embodiment of the present invention. In the roll-forming device 101, components having the same functions as those in the roll-forming device 10 according to the first embodiment are referred with the same reference numerals, and explanation thereof is omitted, namely, is not repeated.

The roll-forming device 101 includes a middle-speed conveyor 1, a low-speed conveyor 2, a high-speed conveyor 3, an adjustment conveyor 4, and a discharge conveyor 5. The discharge conveyor 5 is disposed adjacent to and downstream of the low-speed conveyor 2. The discharge conveyor 5 is a belt conveyor in which an endless belt 51 is wound around a drive pulley 52 and pulleys which include a driven pulley 53 defining an upstream end portion of the discharge conveyor 5. The drive pulley 52 is controllably rotated by a fifth motor M5. The discharge conveyor 5 conveys the rolled food dough PP in the conveying direction X. A moving speed of the discharge conveyor 5 is referred to as V5. The adjustment conveyor 4 is disposed above the discharge conveyor 5 adjacent to and downstream of the high-speed conveyor 3. The adjustment conveyor 4 is attached in a height-adjustable way between side frames FC which stand from both sides of the discharge conveyor 5. The moving surface of the adjustment conveyor 4 is substantially parallel to a moving surface of the discharge conveyor 5 at a given distance and moves in the conveying direction X.

The moving surfaces of the middle-speed conveyor 1, the low-speed conveyor 2, and the discharge conveyor 5 are set at the same height. The high-speed conveyor 3 is disposed above both of the middle-speed conveyor 1 and the low-speed conveyor 2. The upstream end portion (a portion along the driven pulley 33) of the high-speed conveyor 3 overlaps the downstream end portion (a portion along the driven pulley 13) of the middle-speed conveyor 1. Fine concavity and convexity are provided on surfaces of the endless belt 21 and the endless belt 31. The endless belt 31 is wound around the drive pulley 32 and the driven pulley 33 so that a lower surface of the endless belt 31 has a downward flexure between the drive pulley 32 and the driven pulley 33. Namely, the moving surface of the high-speed conveyor 3 is curved downward, and when the food dough piece P (or the rolled food dough PP) passes under the moving surface, the moving surface is deformed. Further, there is a small clearance (for example, 1 millimeter) between the endless belt 31 moving over the recess S and each of the downstream end portion of the middle-speed conveyor 1 and the upstream end portion of the low-speed conveyor 2. Additionally, a clearance between the moving surface of the high-speed conveyor 3 and the moving surface of the low-speed conveyor 2 is generally larger on the downstream side than the upstream side.

The control unit U is configured to adjust the moving speed of each of the conveyors by controlling the driving speed of each of the motors including the fifth motor M5. In the first modification, the moving speed V1 of the middle-speed conveyor 1 may be set to 60 meters per minute, the moving speed V2 of the low-speed conveyor 2 may be set to 25 meters per minute, the moving speed V5 of the discharge conveyor 5 may be set at 30 meters per minute, the moving speed V3 of the high-speed conveyor 3 may be set to 75 meters per minute, and the moving speed V4 of the adjustment conveyor 4 may be set at 40 meters per minute. The first modification will be explained with the assumption that the rolled food dough PP passes through and is discharged from the high-speed conveyor 3 so that a position of the rolled tip PT is different from its desired position. The moving speed V4 of the adjustment conveyor 4 is set to be larger than the moving speed V5 of the discharge conveyor.

The food dough pieces P is conveyed by the middle-speed conveyor 1 in the conveying direction X. The downstream end portion PL of the food dough piece P is deflected obliquely downward to be fed into the recess S. Then, the downstream end PE collides with and contacts the curved portion of the upstream end portion (a portion along the driven pulley 23) of the low-speed conveyor 2 so that a buckling part PS is formed at the downstream end portion PL of the food dough piece P to define the rolling core PA. The rotation R is given to the rolling core PA due to the speed difference between the low-speed conveyor 2 and the high-speed conveyor 3, and the remaining dough portion of the food dough piece P is rolled around the rolling core PA to form a rolled food dough PP. Since the rolled food dough PP is sandwiched between the discharge conveyor 5 and the adjustment conveyor 4, due to the speed difference between the discharge conveyor 5 and the adjustment conveyor 4, the rolled food dough PP is conveyed in the conveying direction X while being rolled in the conveying direction X on the discharge conveyor 5 (counterclockwise viewed from the front side). This rolling can move the position of the rolled tip PT of the rolled food dough PP to its desired position, for example, from a top position to a downstream position.

In the first modification, the endless belt 31 of the high-speed conveyor 3 is deformed so as to follow a change in a diameter of the food dough piece P which diameter gradually becomes large while the food dough piece P is rolled between the high-speed conveyor 3 and the low-speed conveyor 2. Thus, the first modification can be adapted to the change in the diameter of the rolled food dough PP caused by changes in a thickness t of the food dough piece P and/or a number of rolling turns. Namely, it is not necessary to adjust the height of the high-speed conveyor 3 within a certain range for rolled food doughs PP which have different specifications. Further, in the first modification, since a force of holding the food dough piece P is enhanced by the concavity and convexity of the surfaces of the endless belts 21, 31, the turns of the rolled food dough are sealed with each other so that a good product can be obtained. Further, in the first modification, the position of the rolled tip PT of the rolled food dough PP can be adjusted by using the speed difference between the discharge conveyor 5 and the adjustment conveyor 4 before the rolled food dough PP is discharged toward the downstream side.

Figure 6:
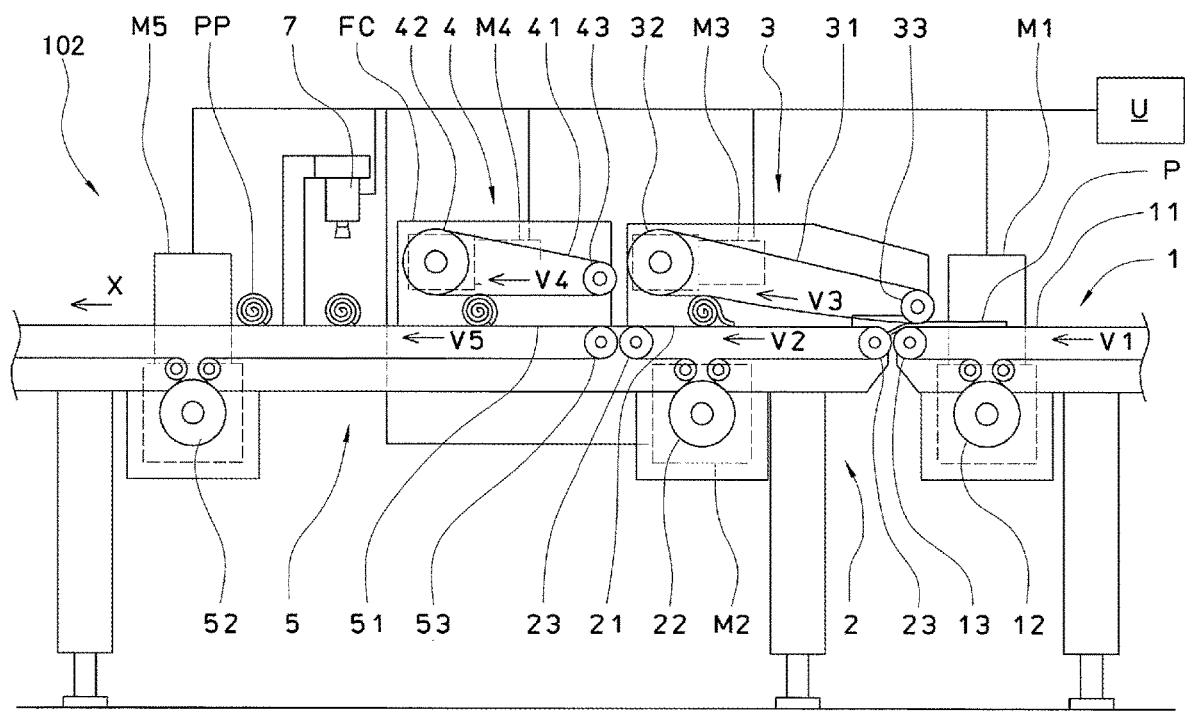
FIG. 6 is a front view of a second modification of the roll-forming device according to the first embodiment of the present invention.

FIG. 6 shows a roll-forming device 102 according to a second modification of the first embodiment of the present invention. In the roll-forming device 102, components having the same functions as those in the roll-forming device 101 according to the first modification of the first embodiment are referred with the same reference numerals, and explanation thereof is omitted, namely, is not repeated.

In the second modification, the position of the rolled tip PT of the rolled food dough PP can be adjusted by using the speed difference between the discharge conveyor 5 and the adjustment conveyor 4 before the rolled food dough PP is discharged toward the downstream side. For example, as shown in FIG. 6, an image camera 7 is disposed downstream of the adjustment conveyor 4 above the discharge conveyor 5, and the moving speed of the adjustment conveyor 4 is increased or decreased so as to adjust the rotational position of the rolled tip PT of the rolled food dough PP based on image processing results by the image camera 7.

Figure 7A:
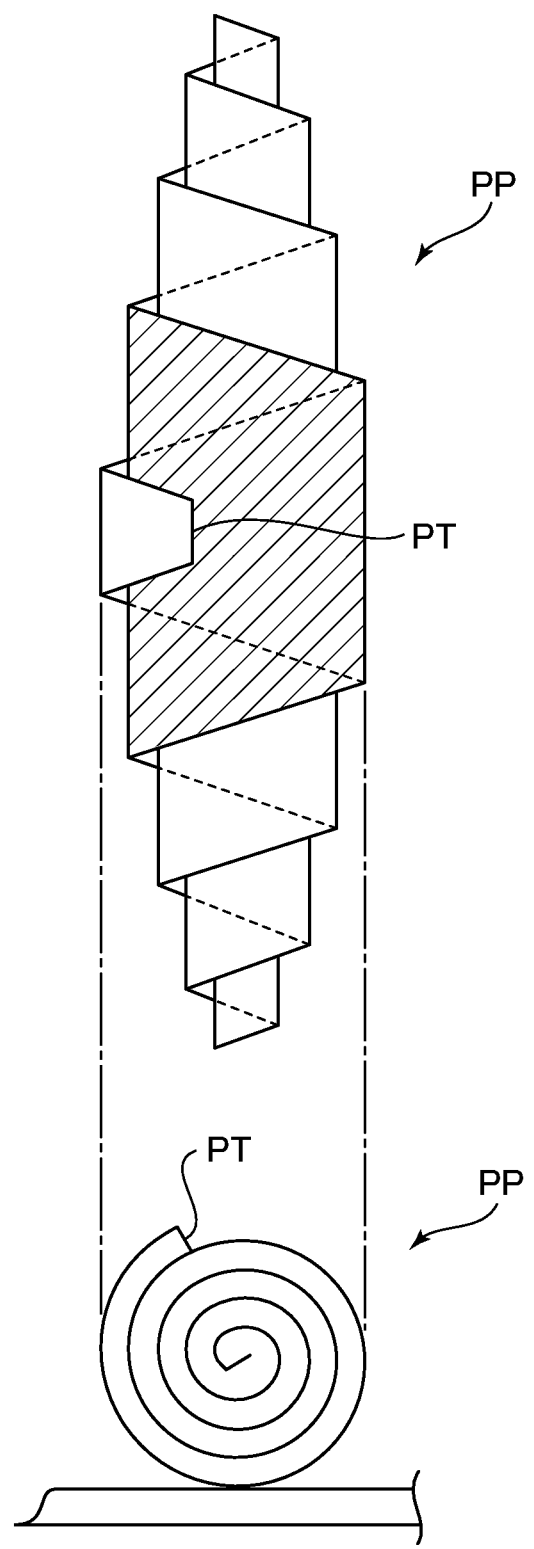
FIG. 7a is a view showing the top and front sides of the rolled food dough in a first position.
Figure 7B:
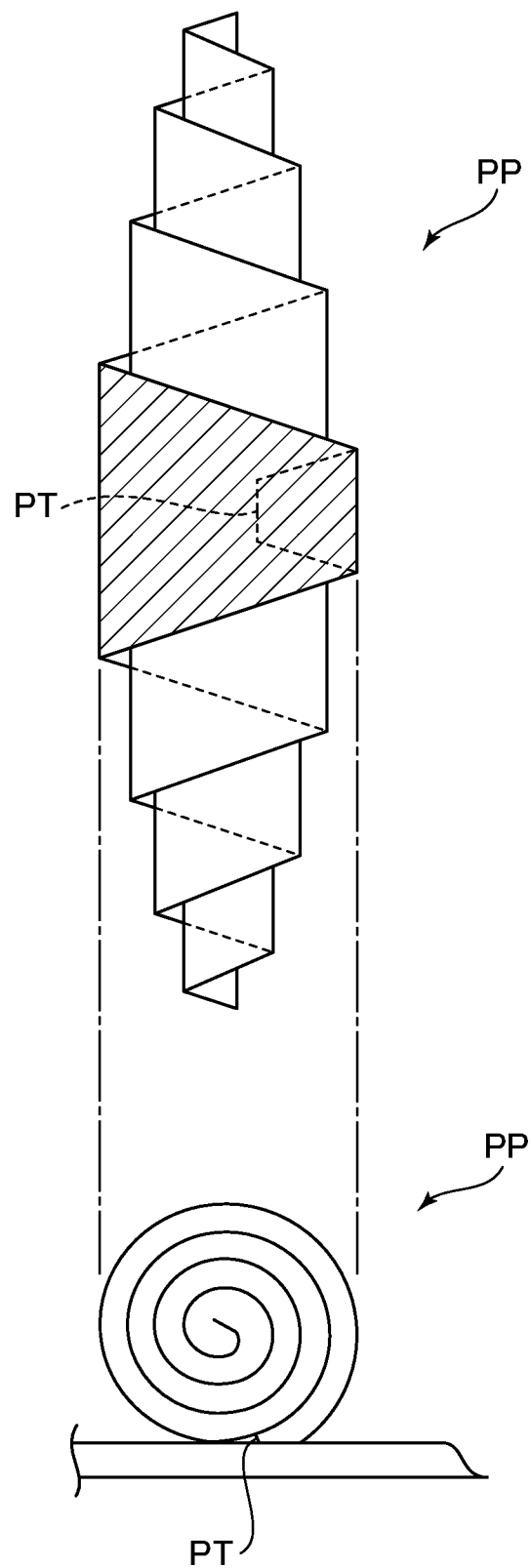
FIG. 7b is a view showing the top and front sides of the rolled food dough in a second position.

Specifically, the rolled food dough PP includes a trapezoidal shape on an upper surface at a central portion of the rolled food dough PP (see the hatched areas shown in FIGS. 7a and 7b). The control unit U analyzes the image from the image camera 7 and measures the length of an upper side and/or a lower side of the trapezoid. The control unit U performs the above-mentioned measurements of any number of the rolled food doughs PP and calculates an average value of the measured lengths.

The control unit U compares the average value with a reference value which was previously input. The reference value is a numerical value representing the lengths of the above-mentioned upper side and/or lower side when the rolled tip PT is located at a desired position for the rolled food dough PP having a predetermined size or weight, for example, a rotational position shown in FIG. 7b. The control unit U makes the average value close to the reference value by increasing the speed difference between the adjustment conveyor 4 and the discharge conveyor 5 when the average value is greater than the reference value or decreasing the speed difference between the adjustment conveyor 4 and the discharge conveyor 5 when the average value is smaller than the reference value.

Referring to FIGS. 8 and 9a-9e, a roll-forming device 20 according to a second embodiment of the present invention will be explained. In the roll-forming device 20, components having functions similar to those in the roll-forming device 10 according to the first embodiment are referred with the same reference numerals, and explanation thereof is omitted, namely, is not repeated. In the roll-forming device 20, the positional relationship between the facing surfaces of the middle-speed and low-speed conveyors 1, 2 and the facing surfaces of the high-speed and adjustment conveyors 3, 4 of the roll-forming device 10 according to the first embodiment is changed upside down, and the positional relationship of the facing surfaces in the conveying direction is changed. Further, although in the roll-forming device 10 according to the first embodiment, the food dough piece P is rolled in the conveying direction X (or rotated counterclockwise viewed from the front side) on the low-speed conveyor 2 to form the rolled food dough PP, in the roll-forming device 20, the food dough piece P is rolled in the conveying direction X with respect to the low-speed conveyor 2, while it is rolled in a direction opposite to the conveying direction X with respect the high-speed conveyor 3 (or rotated clockwise viewed from the front side) to form the rolled food dough PP.

In the roll-forming device 20, with respect to the belt conveyors facing each other in the up-down direction, the high-speed conveyor 3 is disposed on the lower side to convey the food dough piece P. The adjustment conveyor 4 is disposed adjacent to and downstream of the high-speed belt conveyor and also serves as a discharge belt conveyor. The middle-speed conveyor 1 and the low-speed conveyor 2 are disposed along the conveying direction X above the high-speed conveyor 3. The middle-speed conveyor 1 and the low-speed conveyor 2 are attached in a height-adjustable way between side frames FD which stand from both sides of the high-speed conveyor 3. The downstream end portion of the low-speed conveyor 2 (a portion along the drive pulley 22) is disposed so as to overlap the upstream end portion of the adjustment conveyor 4 (a portion along the driven pulley 43) in the conveying direction X. A recess S is defined by a curved portion of the downstream end portion (a portion along the driven pulley 13) which follows the moving surface of the middle-speed conveyor 1 and a curved portion of the upstream end portion (a portion along the driven pulley 23) which continues to the moving surface of the low-speed conveyor 2.

The moving surfaces of the high-speed conveyor 3 and the discharge conveyor 4 are set at the same height. The moving surface of the middle-speed conveyor 1 is inclined downward toward the downstream side so that a clearance between the moving surface of the middle-speed conveyor 1 and the moving surface of the high-speed conveyor 3 gradually becomes small from the upstream side toward the downstream side. The food dough piece PT can be sandwiched between the downstream end portion of the middle-speed conveyor 1 and the high-speed conveyor 3. The moving surface of the low-speed conveyor 2 is inclined upward toward the downstream side so that a clearance between the moving surface of the low-speed conveyor 2 and the moving surface of the high-speed conveyor 3 gradually becomes large from the upstream side toward the downstream side. The food dough piece P to be roll-formed can be continually sandwiched between the low-speed conveyor 2 and the high-speed and discharge conveyors 4, 5. Fine concavity and convexity may be provided on surfaces of the endless belt 21 and the endless belt 31. It may be provided with fine irregularities on the surface of the endless belt 21 and the endless belt 31.

In the second embodiment, the thickness t of the food dough piece P may be 5 millimeters. A clearance a between the moving surface of the high-speed conveyor 3 and the lowest point of the downstream end portion of the middle-speed conveyor 1 may be 4 millimeters. A clearance b between the lowest point of the upstream end portion of the low-speed conveyor 2 and the moving surface of the high-speed conveyor 3 may be 5 millimeters. A clearance c between the moving surface of the downstream end portion of the low-speed conveyor 2 and the moving surface of the discharge conveyor 5 may be 35 millimeters. The clearance c is appropriately determined so that the rolled food dough PP is lightly sandwiched.

In the second embodiment, the moving speed V1 of the middle-speed conveyor 1 may be set at 55 meters per minute, the moving speed V2 of the low-speed conveyor 2 may be set at 13 meters per minute, the moving speed V3 of the high-speed conveyor 3 may be set at 60 meters per minute, and the moving speed V5 of the adjustment conveyor 4 may be set at 13 meters per minute.

Figure 8:
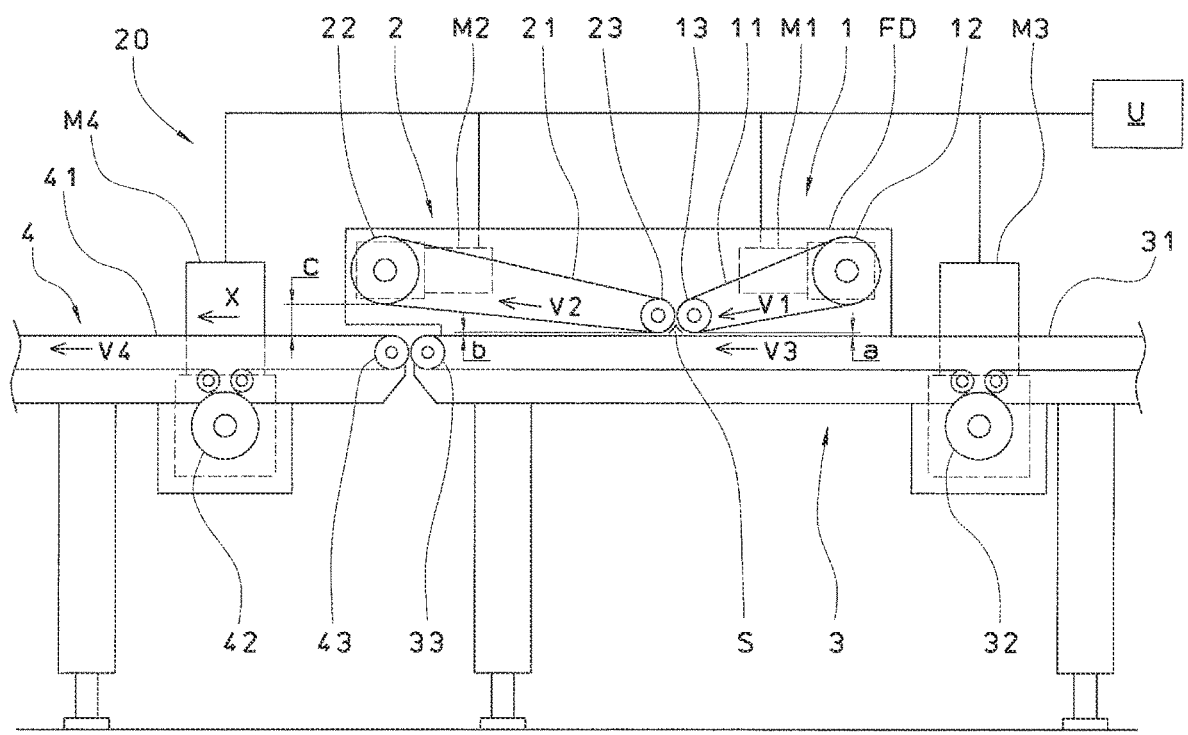
FIG. 8 is a front view of a roll-forming device according to a second embodiment of the present invention.

Referring to FIG. 8, the food dough piece P is conveyed in the conveying direction X by the high-speed conveyor 3. The food dough piece P is sandwiched between the downstream end portion (a portion along the driven pulley 13) of the middle-speed conveyor 1 and the high-speed conveyor 3. Since the moving speed V1 of the upper low-speed conveyor is lower than the moving speed V3 of the lower high-speed conveyor, an upper-side portion of the food dough piece P is fed toward the downstream slower than a lower-side portion of the food dough piece P.

Figure 9A:
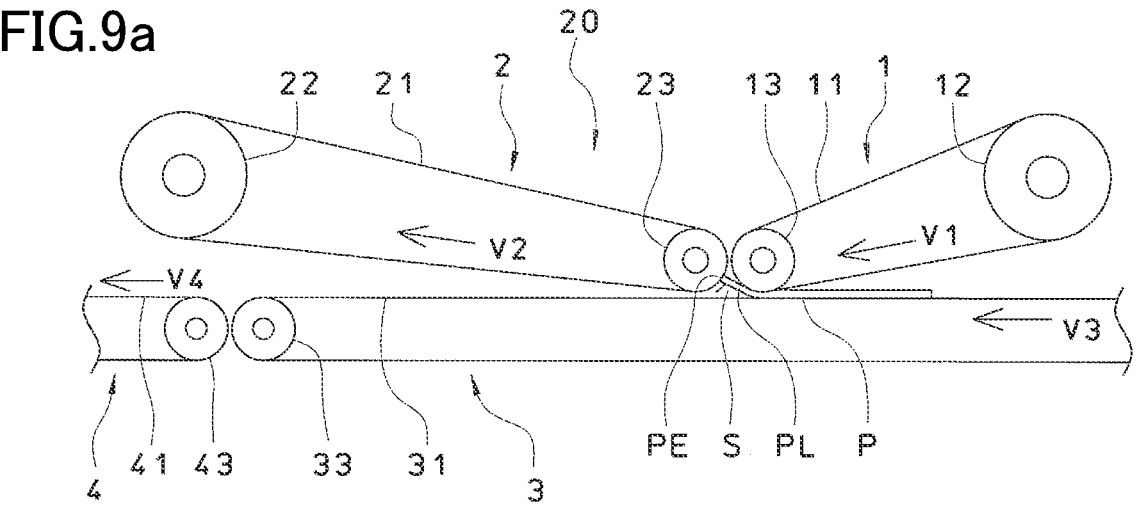
FIG. 9a is an explanatory view of a forming process of a food dough piece in the roll-forming device according to the second embodiment of the present invention.

Due to the speed difference between the upper-side portion and the lower-side portion, the downstream end portion PL of the food dough piece P is deflected obliquely upward from the downstream end portion of the middle-speed conveyor 1 to be fed, so that the downstream end PE of the food dough P collides with and contacts the curved portion of the upstream end portion of the low-speed conveyor 2 (a portion along the driven pulley 23) (see FIG. 9a). These collision and contact cause a conveyed speed of the downstream end PE of the food dough piece P to be momentarily reduced, so that a buckling part PS is formed at the downstream end portion PL of the food dough piece P following the downstream end PE.

Figure 9B:
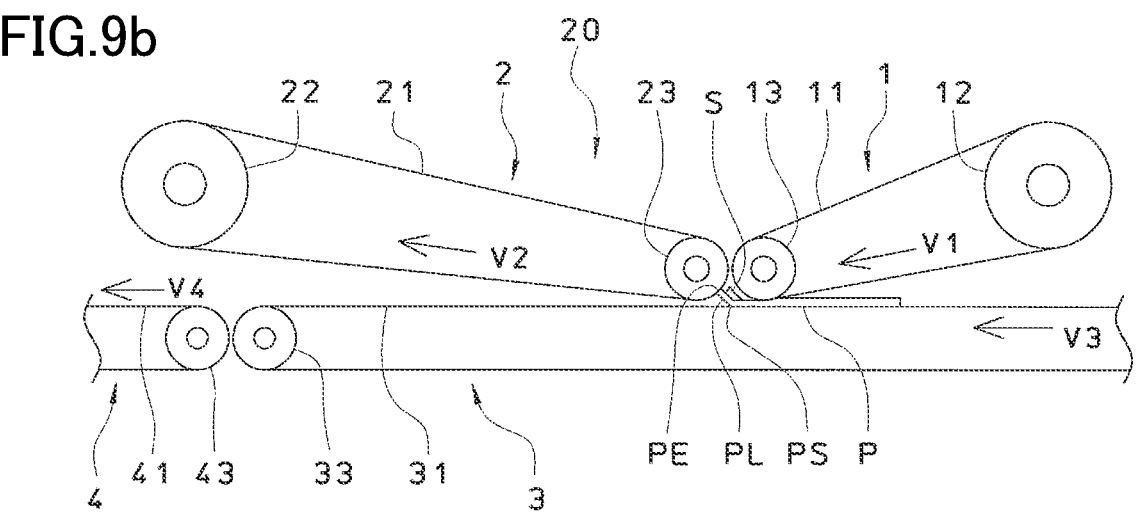
FIG. 9b is an explanatory view of a forming process of a food dough piece in the roll-forming device according to the second embodiment of the present invention.
Figure 9C:
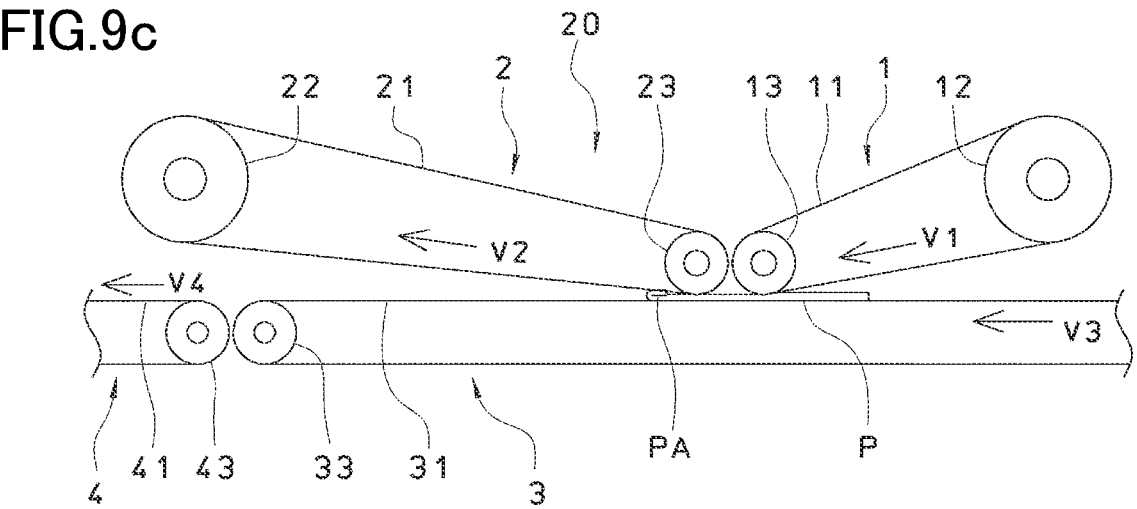
FIG. 9c is an explanatory view of a forming process of a food dough piece in the roll-forming device according to the second embodiment of the present invention.
Figure 9D:
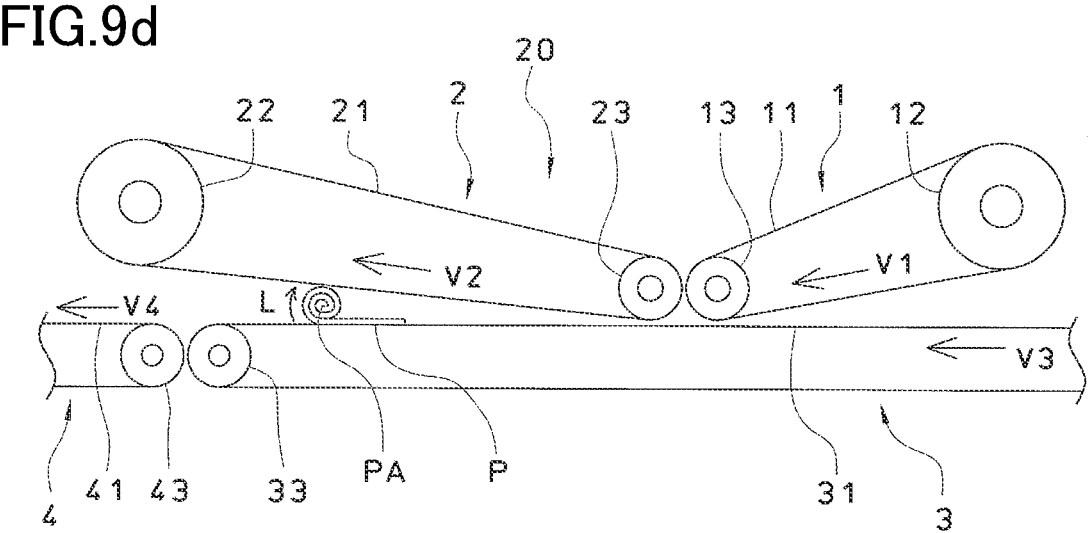
FIG. 9d is an explanatory view of a forming process of a food dough piece in the roll-forming device according to the second embodiment of the present invention.

Since the high-speed conveyor 3 moves faster than the low-speed conveyor 2, the buckling part PS is fed earlier than the downstream end PE of the food dough piece P in the conveying direction X so that the downstream end portion PL of the food dough piece P is folded (see FIG. 9b). The downstream end portion PL folded at the buckling part PS is overlapped and adhesively pressed between the high-speed conveyor 3 and the low-speed conveyor 2 to form a rolling core PA (see FIG. 9c).

While the rolling core PA is fed from the recess S toward the downstream side, a rotation L is continuously given to the rolling core PA due to the speed difference between the low-speed conveyor 2 and the high-speed conveyor 3. A direction of the rotation L is defined so that the rolling core PA on the high-speed conveyor 3 is rolled in a direction opposite to the conveying direction X. Since the rolling core PA is rolled, the remaining dough portion is gradually rolled around the rolling core PA. Simultaneously a tension along the conveying direction X is applied to the remaining dough portion of the food dough piece P which has not been rolled (see FIG. 9c). Due to this tension, a possible turn of an orientation from the downstream end PE to the upstream tip PT of the food dough piece P can be corrected. Further, the remaining dough portion can be tightly rolled around the rolling core PA so that the rolled food dough PP is formed without generating a cavity at its center (see FIG. 9d).

Figure 9E:
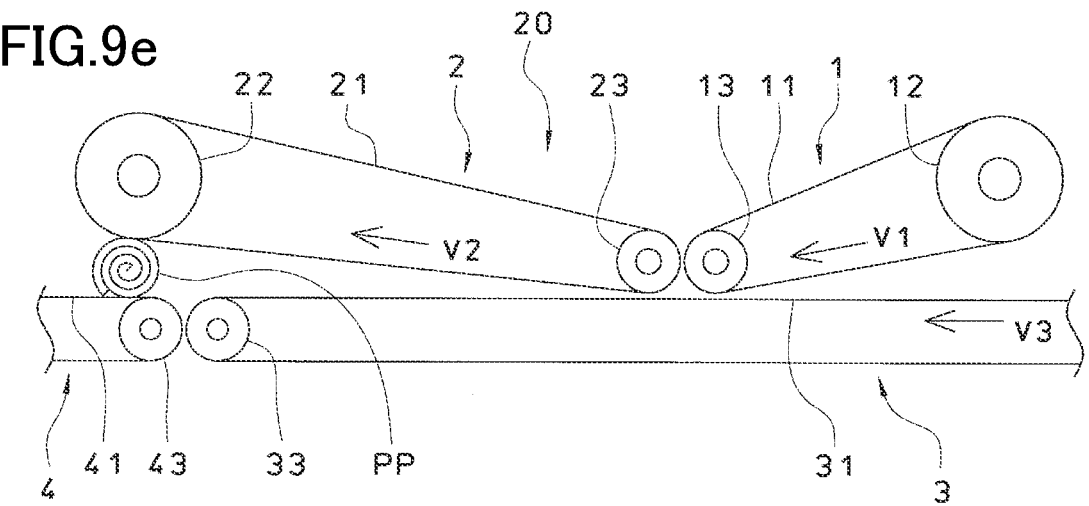
FIG. 9e is an explanatory view of a forming process of a food dough piece in the roll-forming device according to the second embodiment of the present invention.

After the rolled food dough PP passes through the high-speed conveyor 3, the rolled food dough PP is sandwiched between the low-speed conveyor 2 and the adjustment conveyor 4 (see FIG. 9e). Since the moving speeds of the low-speed conveyor 2 and the adjustment conveyor 4 are set to the same as each other, the rolled food dough PP is sandwiched without being given a rotation and then discharged toward the downstream side. By causing a speed difference between the low-speed conveyor 2 and the adjustment conveyor 4 to give the rolled food dough PP a few rotation, the position of the rolled tip PT of the rolled dough piece P on a conveyor disposed on the downstream side can be adjusted (see FIG. 10 explaining a first modification below).

Further, by causing a speed difference between the low-speed conveyor 2 and the adjustment conveyor 4 to give the rolled food dough PP a rotation, the position of the rolled tip PT of the rolled dough piece P on a conveyor disposed on the downstream side can be adjusted.

Figure 10:
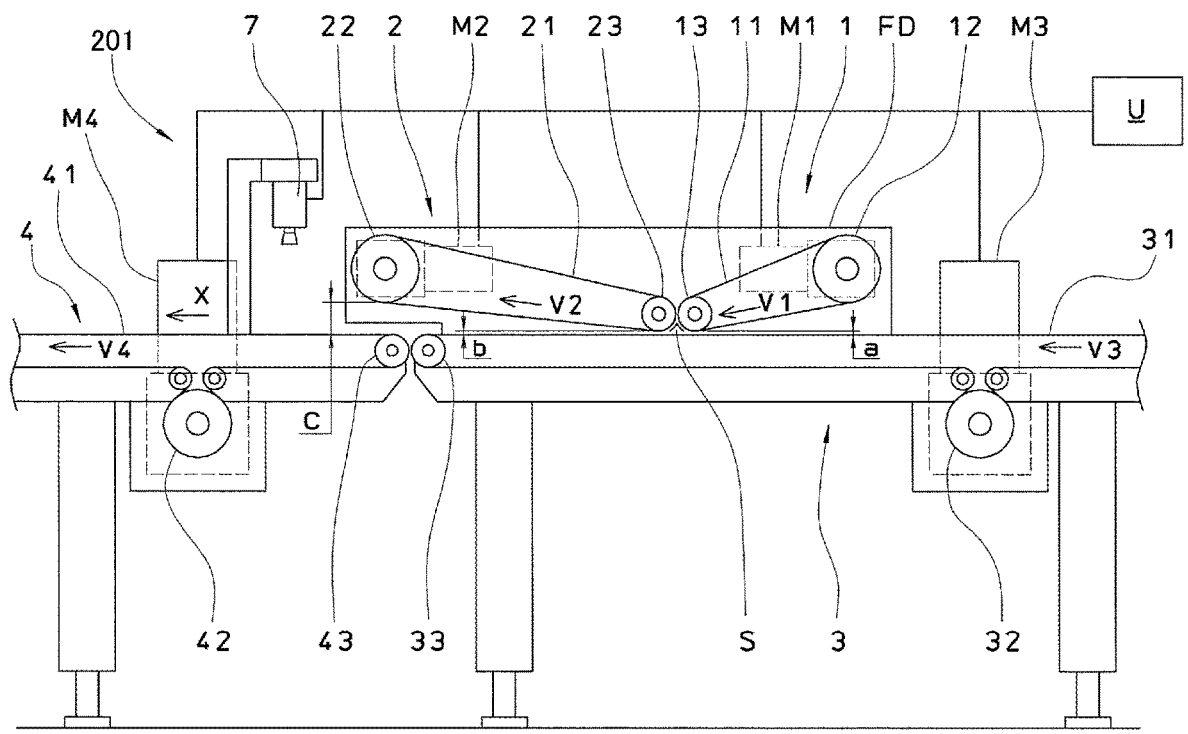
FIG. 10 is a front view of a first modification of the roll-forming device according to the second embodiment of the present invention.

FIG. 10 shows a roll-forming device 201 according to a first modification of the second embodiment of the present invention. In the roll-forming device 201, components having the same functions as those in the roll-forming device 20 according to the second embodiment are referred with the same reference numerals, and explanation thereof is omitted, namely is not repeated.

For example, as explained in the second modification of the first embodiment, the moving speeds of the low-speed conveyor 2 and the adjustment conveyor 4 may be increased or decreased so as to adjust the position of the rolled tip PT of the rolled food dough PP based on image processing results by the image camera 7. In the second embodiment, since a rolling direction in the rolled food dough PP is opposite to that in the rolled food dough PP in the first embodiment, the control unit U makes the average value close to the reference value by decreasing the speed difference between the adjustment conveyor 4 and the low-speed conveyor 2 when the average value is greater than the reference value or increasing the speed difference between the adjustment conveyor 4 and the low-speed conveyor 2 when the average value is smaller than the reference value.

According to the second embodiment of the present invention, it is possible to produce a rolled food product into which a solid material, such as a chocolate bar or a sausage, is rolled.

Although the embodiments of the present invention have been explained, the present invention is not limited to the above-stated embodiments, and various modifications are possible within the scope of the invention recited in the claims, namely, are fallen within the scope of the present invention. The positional relationship of the conveyors can be appropriately adjusted according to properties of the food dough piece P, such as specific gravity, hardness or softness, thickness and dimensions. For example, a step may be provided between the moving surface of the under-side middle-speed conveyor 1 and the moving surface of the under-side low-speed conveyor 2. Such a step may be intermittently formed by employing a lift mechanism, such as piston mechanism, which engages the driven pulley 23 at the upstream end portion of the low-speed conveyor 2 and controlling the lift mechanism by the control unit U. Also, in this modification, the recess S can be defined so as to deflect the downstream end portion PL of the food dough piece P.

Figure 11:
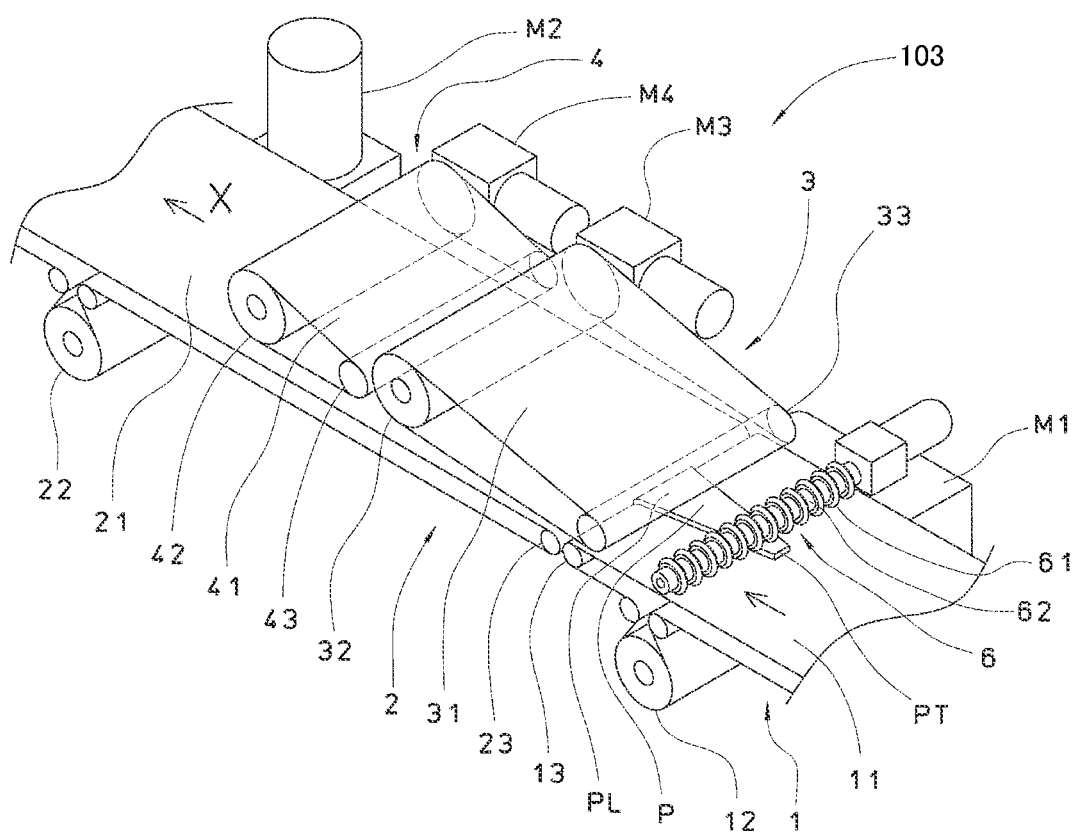
FIG. 11 is a perspective view of a third modification of the roll-forming device according to the first embodiment of the present invention.

Further, in the first embodiment and the first and second modifications thereof, a press roller 6 may be disposed upstream of the high-speed conveyor 3 above the middle-speed conveyor 1, as a roll-forming device 103 according to a third modification of the first embodiment shown in FIG. 11. The press roller 6 may be cylindrical or preferably have a plurality rows of protrusions 61 and bottoms 62 along an axial direction of the press roller, the protrusions 61 and the bottoms 62 extending peripherally. The press roller 6 is rotationally driven by an appropriate motor so as to move in the conveying direction X a peripheral surface of the press roller on a side facing the middle-speed conveyor 1. The rotational speed of the press roller 6 may be appropriately determined, but preferably the peripheral speed of the press roller 6 and the moving speed V1 of the middle-speed conveyor 1 are the same as each other. A clearance between the press roller 6 and the middle-speed conveyor 1 is determined so that the food dough piece P is sandwiched between the protrusions 61 and the middle-speed conveyor 1.

When the press roller 6 is employed as described above, a portion of the food dough piece P to be roll-formed near the downstream end portion PL is sandwiched between the middle-speed conveyor 1 and the high-speed conveyor 3, while a portion of the food dough piece P near the upstream tip PT is sandwiched between the middle-speed conveyor 1 and the press roller 6. Then, due to the speed difference between the high-speed conveyor 3 and the press roller 6, the food dough piece P is extended in the conveying direction X and rolled under tension in the conveying direction X inside of the food dough piece P. Further, since the downstream end portion PL is rolled little by little as compared with a device without the press roller 6, a diameter of the rolling core PA is relatively small. Thus, a possibility that the rolled food dough PP loosens, or the food dough piece P is rolled loosely can be reduced, so that the rolled food dough PP which is relatively tightly rolled can be formed.

Further, when the press roller 6 has the protrusions 61, since a movement of the food dough piece P in the width direction is restricted by the protrusions 61, the rolled dough food which is turned or distorted can be prevented. Further, a contacting area between the press roller 6 and the food dough piece when the press roller 6 has the protrusion is smaller than a contacting area between the cylindrical press roller and the food dough piece so that the food dough piece can be prevented from adhering the press roller 6.

The effect of extending the food dough piece P can be equally achieved not only by the press roller 6 but also by a conveyor belt which is disposed upstream of the high-speed conveyor above the middle-speed conveyor, and a device of intermittently lifting an lowering the upstream tip PT of the food dough piece P to cause the upstream tip PT contact the conveyor disposed above it for a predetermine period. Further, a size of the rolling core A and/or roll tightening of the rolled food dough can be modified by adjusting a clearance between the press roller 6 and the middle-speed conveyor 1.

Further, the middle-speed conveyor may be a roller conveyor which consists of a single roller or a plurality of rollers. Even if the middle-speed conveyor is a roller conveyor, a peripheral speed of the roller can be set at a middle speed by facing the high-speed conveyor 3 and being connected to a motor controlled by the control unit U. Further, the recess S can be formed between the curved downstream portion (downstream end portion) of the middle-speed roller conveyor and the curved portion of the upstream end portion of the low-speed conveyor 2. Thus, the downstream end portion PL of the food dough piece P can be deflected to form the rolling core PA, and thus, to form the rolled food dough PP. Further, the downstream end portion of the middle-speed conveyor and the upstream end portion of the low-speed conveyor may not be curved portions, as long as they can form the recess S.

Further, the control unit U may be operated in a manual input mode or in an automatic adjustment mode. In the manual input mode, since the moving speed of each of the conveyors can be freely set, the number of turns of the rolled food dough PP can be adjusted by varying the ratios between the moving speeds of the conveyors. Further, in the automatic adjustment mode, each of the moving speeds V1, V2, V3 can be increased or decreased according to the ratio which is previously registered to change the production capacity.

1: middle-speed conveyor
2: low-speed conveyor
3: high-speed conveyor
4: adjustment conveyor
6: press roller
61: protrusion
62: bottom
11, 21, 31, 41: conveyor belt
12, 22, 32, 42: drive pulley
13, 23, 33, 43: driven pulley
M1: first motor
M2: second motor
M3: third motor
M4: fourth motor
U: control unit 10, 101, 20: roll-forming device
P: food dough piece
PT: upstream tip, rolled tip
PE: downstream end
PL: downstream end portion
PS supination
PA rolling core
PP rolled food dough

What is claimed:

1. A method of forming a rolled food dough from a food dough piece comprising steps of:
    conveying a food dough piece into a space between a middle-speed conveyor and a high-speed conveyor, a speed of the high-speed conveyor being higher than a speed of the middle-speed conveyor, the high-speed conveyor facing the middle-speed conveyor and moving in the same direction as the middle-speed conveyor;
    feeding a high-speed-conveyor-side portion of the food dough piece faster than a middle-speed-conveyor-side portion of the food dough piece due to a speed difference between the middle-speed conveyor and the high-speed conveyor, so as to deflect a downstream end portion of the food dough piece toward a middle-speed-conveyor side;
    causing the deflected downstream end portion of the food dough piece to collide with an upstream end portion of a low-speed conveyor which is disposed downstream of the middle-speed conveyor, a speed of which is lower than the middle-speed conveyor, and which moves in the same direction as the middle-speed conveyor;
    forming a buckling part in the deflected downstream end portion of the food dough due to a speed difference between the middle-speed conveyor and the low-speed conveyor, and folding the deflected downstream end portion at the buckling part;
    adhesively pressing the folded downstream end portion of the food dough piece between the low-speed conveyor and the high-speed conveyor facing the low-speed conveyor so as to form a rolling core; and
    rolling the food dough piece around the rolling core between the low-speed conveyor and the high-speed conveyor due to a speed difference between the low-speed conveyor and the high-speed conveyor so as to form a rolled food dough.

2. The method according to claim 1,
    wherein the high-speed conveyor is disposed above the middle-speed and low-speed conveyors, and
    wherein an upstream end portion of the high-speed conveyor is disposed upstream of the downstream end portion of the middle-speed conveyor.

3. The method according to claim 2,
    wherein the moving surface of the high-speed conveyor is disposed so that a clearance between the moving surface of the high-speed conveyor and the moving surfaces of the middle-speed and low-speed conveyors becomes larger from the upstream side toward the downstream side.

4. The method according to claim 2,
    wherein the high-speed conveyor is a belt conveyor, and
    wherein the moving surface of the high-speed conveyor facing the low-speed conveyor disposed below the high-speed conveyor has a downward flexure.

5. The method according to claim 2,
    further comprising a step of adjusting a position of a rolled tip of the rolled food dough by using an adjustment conveyor which is disposed above the low-speed conveyor and disposed adjacent to and downstream of the high-speed conveyor.

6. The method according to claim 5,
wherein the step of adjusting the position of the rolled tip includes a step of detecting information relating to the position of the rolled tip of the rolled food dough by using a camera which is disposed downstream of the adjustment conveyor.

7. The method according to claim 6,
wherein the food dough piece has an approximately triangular shape, and
wherein the step of adjusting the position of the rolled tip further includes steps of analyzing an image from the camera, measuring a length of an upper side and/or a lower side of a trapezoidal shape at a central portion of the rolled food dough, calculating an average value of the length, and comparing the average value and a reference value.

8. The method according to claim 2,
further comprising steps of sandwiching a portion of the food dough piece near the downstream end portion between the middle-speed conveyor and the high-speed conveyor and sandwiching a portion of the, food dough piece near the upstream tip between the middle-speed conveyor and a press roller which is disposed upstream of the high-speed conveyor above the middle-speed conveyor to extend the food dough piece.

9. The method according to claim 1,
wherein the middle-speed and low-speed conveyors are disposed above the high-speed conveyor.

10. The method according to claim 9,
wherein the moving surface of the middle-speed conveyor is disposed so that a clearance between the moving surface of the middle-speed conveyor and the moving surface of the high-speed conveyor becomes smaller from the upstream side toward the downstream side, and
wherein the moving surface of the low-speed conveyor is disposed so that a clearance between the moving surface of the low-speed conveyor and the moving surfaces of the high-speed conveyor becomes larger from the upstream side toward the downstream side.

11. The method according to claim 9,
wherein the low-speed conveyor is a belt conveyor, and
wherein the moving surface of the low-speed conveyor facing the lower high-speed conveyor has a downward flexure.

12. The method according to claim 9,
further comprising a step of adjusting a position of a rolled tip of the rolled food dough by using an adjustment conveyor which is disposed below the low-speed conveyor and disposed adjacent to and downstream of the high-speed conveyor.

13. The method according to claim 12,
wherein the step of adjusting the position of the rolled tip includes a step of detecting information relating to the position of the rolled tip of the rolled food dough by using a camera which disposed downstream of the low-speed conveyor.

14. The method according to claim 13,
wherein the food dough piece has an approximately triangular shape, and
wherein the step of adjusting the position of the rolled tip further includes steps of analyzing an image from the camera, measuring a length of an upper side and/or a lower side of a trapezoidal shape at a central portion of the rolled food dough, calculating an average value of the length, and comparing the average value and a reference value.

* * * * *